(12) United States Patent
Kato et al.

(10) Patent No.: US 9,254,480 B2
(45) Date of Patent: Feb. 9, 2016

(54) OXIDATION CATALYST FOR EXHAUST GAS PURIFICATION, METHOD FOR PRODUCING THE SAME, AND EXHAUST GAS PURIFICATION METHOD USING THE SAME

(75) Inventors: Naohiro Kato, Himeji (JP); Yosuke Goto, Himeji (JP); Yuta Akasaka, Himeji (JP)

(73) Assignees: Umicore Shokubai Japan Co., Ltd., Tokyo (JP); Umicore Shokubai USA Inc., Auburn Hills, MI (US)

( * ) Notice: Subject to any disclaimer, the term of this patent is extended or adjusted under 35 U.S.C. 154(b) by 0 days.

(21) Appl. No.: 14/006,691

(22) PCT Filed: Mar. 21, 2012

(86) PCT No.: PCT/JP2012/057233
§ 371 (c)(1),
(2), (4) Date: Nov. 20, 2013

(87) PCT Pub. No.: WO2012/128297
PCT Pub. Date: Sep. 27, 2012

(65) Prior Publication Data
US 2014/0065043 A1  Mar. 6, 2014

(30) Foreign Application Priority Data
Mar. 24, 2011 (JP) .................. 2011-066583

(51) Int. Cl.
*B01J 23/58* (2006.01)
*B01J 29/74* (2006.01)
(Continued)

(52) U.S. Cl.
CPC ............. *B01J 29/7415* (2013.01); *B01D 53/94* (2013.01); *B01D 53/944* (2013.01); *B01J 23/58* (2013.01);
(Continued)

(58) Field of Classification Search
CPC ................. B01D 53/94; B01D 53/944; B01D 2255/204; B01D 2255/1021; B01D 2255/1023
USPC ........................................ 502/328; 423/213.5
See application file for complete search history.

(56) References Cited

U.S. PATENT DOCUMENTS 6,444,610 B1   9/2002  Yamamoto
8,323,599 B2  12/2012  Nunan et al.
(Continued)

FOREIGN PATENT DOCUMENTS

CN        1575850 A   2/2005
CN      101410597 A   4/2009
(Continued)

OTHER PUBLICATIONS

International Search Report (PCT/ISA/210) mailed on Jun. 19, 2012, by the Japanese Patent Office as the International Searching Authority for International Application No. PCT/JP2012/057233.
(Continued)

*Primary Examiner* — Colleen Dunn
*Assistant Examiner* — Haytham Soliman
(74) *Attorney, Agent, or Firm* — Buchanan Ingersoll & Rooney PC

(57) ABSTRACT

The purpose of the present invention is to provide an oxidation catalyst for exhaust gas purification having high durability and a method for producing the catalyst. The purpose is achieved by an oxidation catalyst for exhaust gas purification containing a refractory inorganic oxide, and a catalyst component and a metal component, which are supported on the refractory inorganic oxide, wherein the catalyst component is platinum, or platinum and palladium, and the metal component is one or more selected from the group consisting of magnesium, calcium, strontium and barium.

21 Claims, 5 Drawing Sheets

(51) Int. Cl.
  *B01D 53/94* (2006.01)
  *B01J 37/02* (2006.01)
  *B01J 35/00* (2006.01)
  *B01J 29/70* (2006.01)
  *B01J 35/04* (2006.01)

(52) U.S. Cl.
  CPC .......... *B01J 29/7007* (2013.01); *B01J 35/0006* (2013.01); *B01J 35/04* (2013.01); *B01J 37/0215* (2013.01); *B01J 37/0246* (2013.01); *B01D 2255/1021* (2013.01); *B01D 2255/1023* (2013.01); *B01D 2255/204* (2013.01)

(56) References Cited

U.S. PATENT DOCUMENTS

| | | | |
|---|---|---|---|
| 8,323,767 | B2 | 12/2012 | Ido et al. |
| 8,557,204 | B2 | 10/2013 | Nunan et al. |
| 2004/0224837 | A1 | 11/2004 | Horiuchi et al. |
| 2007/0238605 | A1 | 10/2007 | Strehlau et al. |
| 2009/0056318 | A1 | 3/2009 | Ikeda et al. |
| 2009/0107122 | A1 | 4/2009 | Ikeda et al. |

FOREIGN PATENT DOCUMENTS

| | | |
|---|---|---|
| EP | 1 068 892 A2 | 1/2001 |
| EP | 2 105 192 A1 | 9/2009 |
| JP | 2003-175318 A | 6/2003 |
| JP | 2006-125206 A | 5/2006 |
| JP | 2007/534477 A | 11/2007 |
| JP | 2010-270695 A | 12/2010 |
| WO | WO 2007/114082 A1 | 10/2007 |
| WO | 2012/069404 A1 | 5/2012 |
| WO | 2012/069405 A1 | 5/2012 |

OTHER PUBLICATIONS

Written Opinion (PCT/ISA/237) mailed on Jun. 5, 2012, by the Japanese Patent Office as the International Searching Authority for International Application No. PCT/JP2012/057233.

Extended Search Report issued on Sep. 16, 2014, by the European Patent Office in corresponding European Patent Application No. 12760651.5-1352 (8 pages).

Office Action issued on May 15, 2015, by the Chinese Patent Office in corresponding Chinese Patent Application No. 201280016090.2, and an English translation of the Office Action. (17 pages).

OXIDATION CATALYST FOR EXHAUST GAS PURIFICATION, METHOD FOR PRODUCING THE SAME, AND EXHAUST GAS PURIFICATION METHOD USING THE SAME

TECHNICAL FIELD

The present invention relates to an oxidation catalyst for exhaust gas purification, a method for producing the catalyst, and an exhaust gas purification method using the catalyst. Particularly, the invention relates to an oxidation catalyst for exhaust gas purification effective to purification of an exhaust gas, in particular, an exhaust gas from diesel engine, a method for producing the catalyst, and an exhaust gas purification method using the catalyst.

BACKGROUND ART

A large number of techniques for processing an exhaust gas generated from internal combustions have been conventionally proposed. In particular, various techniques for processing an exhaust gas from diesel engine have been proposed for the purpose of reduction of discharge of particulate materials (PM) and NOx contained in an exhaust gas. For example, as catalysts for purifying an exhaust gas, oxidization catalysts which oxidize carbon monoxide (hereinafter also referred to as "CO") and hydrocarbon (hereinafter also referred to as "HC") into $CO_2$ and $H_2O$, NOx storage catalysts which store nitrogen oxides (hereinafter also referred to as "NOx"), three-way catalysts which simultaneously remove NOx, CO and HC, and the like have been proposed.

An oxidation catalyst for processing an exhaust gas is required to have high thermal durability since it is exposed to an exhaust gas with a high temperature. For example, Patent Literature 1 discloses refractory inorganic oxide powder, which contains platinum and palladium in a mass ratio of 20/1 to 1/1 as an oxidation catalyst improved in heat resistance.

CITATION LIST

Patent Literature

Patent Literature 1: JP 2006-125206 A

SUMMARY OF INVENTION

Technical Problem

However, durability of catalysts has been not sufficient with the techniques in Patent Literature 1, and further improvements have been desired. In addition, the above described literature does not disclose a catalyst capable of effectively processing carbon monoxide (CO) and hydrocarbon (HC) when an exhaust gas temperature is a low temperature in processing an exhaust gas, particularly, an exhaust gas from diesel engine.

Therefore, an object of the present invention is to provide an oxidation catalyst for exhaust gas purification with high durability and a method for producing the catalyst. Another object of the present invention is to provide an oxidation catalyst for exhaust gas purification, which is capable of effectively processing an exhaust gas, particularly carbon monoxide (CO) and hydrocarbon (HC) in the exhaust gas at a low temperature, and a method for producing the catalyst.

Solution to Problem

The present inventors made intensive studies in order to solve the above described problems, and as a result, they found that HC and CO in an exhaust gas can be effectively processed with an oxidation catalyst containing a refractory inorganic oxide, and a catalyst component and a specific metal component, which are supported on the refractory inorganic oxide, and the present invention was thus completed.

More specifically, the present invention provides an oxidation catalyst for exhaust gas purification comprising a refractory inorganic oxide, and a catalyst component and a metal component, which are supported on the refractory inorganic oxide, wherein the catalyst component is platinum, or platinum and palladium, and the metal component is one or more selected from the group consisting of magnesium, calcium, strontium and barium.

Advantageous Effects of Invention

According to the present invention, an oxidation catalyst for exhaust gas purification having high durability and a method for producing the catalyst are provided.

DESCRIPTION OF EMBODIMENTS

Figure 1:
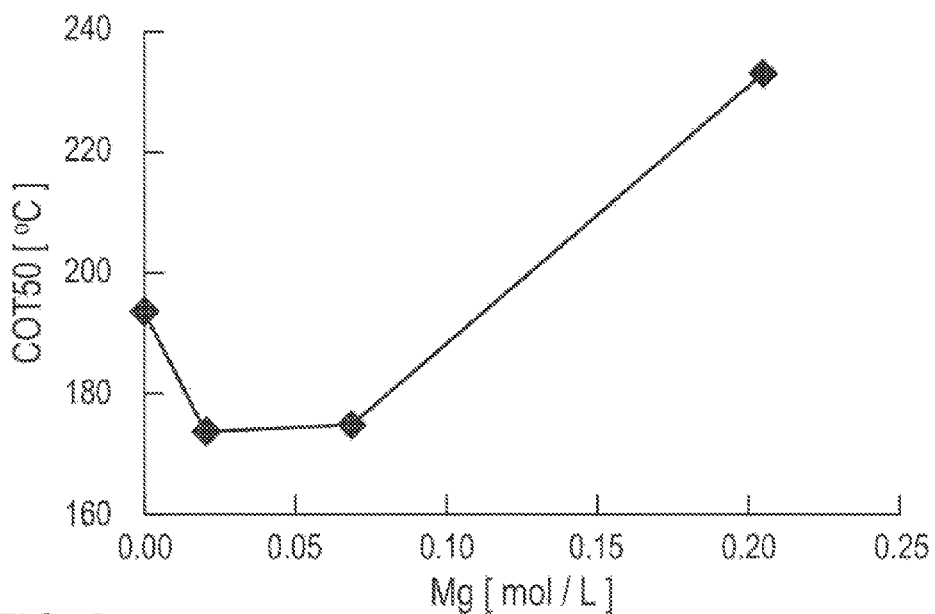
FIG. 1 is a graph showing Mg contents and 50% CO conversion in catalysts (three-dimensional structures) obtained in examples.

The present invention is an oxidation catalyst for exhaust gas purification containing a refractory inorganic oxide, and a catalyst component and a metal component, which are supported on the refractory inorganic oxide, wherein the catalyst component is platinum, or platinum and palladium, and the metal component is one or more selected from the group consisting of magnesium, calcium, strontium and barium (hereinafter, the oxidation catalyst for exhaust gas purification of the present invention may be also referred to simply as "the oxidization catalyst" or "the catalyst".)

That is, in the oxidation catalyst for exhaust gas purification of the present invention, a refractory inorganic oxide, platinum, or platinum and palladium, and one or more elements selected from the group consisting of magnesium, calcium, strontium and barium are essentially present. Among these materials, platinum and palladium have oxidation activity and thus purify an exhaust gas by converting nitrogen oxide (NOx), carbon monoxide (CO), and hydrocarbon (HC) that is an unburned component of fuel such as gasoline or fuel of a diesel engine such as light oil and heavy oil into harmless carbon dioxide, water, nitrogen, and the like.

The oxidation catalyst for exhaust gas purification of the present invention can effectively purify carbon monoxide (CO) and hydrocarbon (HC), and in particular, favorably used as an oxidation catalyst for exhaust gas purification, which is effective for purification of an exhaust gas from a diesel engine. The group 2 elements such as barium are used as NOx storage catalysts or three-way catalysts with, for example, catalyst components such as platinum and palladium. Specifically, when platinum and barium are contained as NOx storage catalysts, barium is used for the purpose of storage of NOx. However, during storage of NOx, barium is known to decrease oxidation performance of platinum in the lean side. Barium may be used in a three-way catalyst containing palladium in order to improve reducing performance on NOx in the rich side. However, these are not used for the purpose of improving oxidation performance in the lean side. As described above, the group 2 elements improve NOx storage performance and reducing performance on NOx, but are known to decrease oxidation performance in the lean side. The catalyst containing platinum, or platinum and palladium, and one or more elements selected from the group consisting of magnesium, calcium, strontium and barium in the present invention is particularly excellent as an oxidation catalyst that oxidizes HC and CO into $CO_2$ and $H_2O$ in the lean side. The mechanism capable of attaining the above described advantage is indefinite, however, can be deduced as follows. In addition, the present invention is not limited to the deduction described below at all.

When platinum, or platinum and palladium are used as catalyst components, there was a tendency that particles of platinum, or platinum and palladium (hereinafter referred to as "Pt or Pt/Pd") are aggregated by heat and the particles are coarsened to thus deteriorate catalytic performance. It is presumed that the group 2 elements suppress aggregation of Pt or Pt/Pd particles due to heat in the present invention. That is, it is considered that the Pt or Pt/Pd particles have intensive interaction with the group 2 elements and presence of the group 2 elements thus suppresses aggregation of the Pt or Pt/Pd particles. In other words, it is presumed that since the group 2 elements strongly attract Pt or Pt/Pd particles, the agglomeration of the particles due to transferring the Pt or Pt/Pd particles by heat would be suppressed. It is further presumed that since primary particles of the group 2 elements also intervene among Pt or Pt/Pd particles, contact among the primary particles of the group 2 elements is small and progress in aggregation of the primary particles is sufficiently prevented. Therefore, it is presumed that the Pt or Pt/Pd particles and the primary particles of the group 2 elements suppress in particle growth with other particles respectively and the above described effect is thus attained. Such a suppression effect of the primary particles aggregation is exerted by supporting both Pt or Pt/Pd and the group 2 elements on a refractory inorganic oxide, or by supporting Pt or Pt/Pd on a refractory inorganic oxide, thereafter supporting the group 2 elements on the Pt or Pt/Pd-supporting refractory inorganic oxide. In addition, when Pt and Pd are used in combination as catalyst components, this effect is more exerted by supporting Pt and Pd simultaneously.

As described above, since Pt or Pt/Pd particles and primary particles of the group 2 elements suppress particle growth and agglomeration each other, the catalyst of the present invention is considered to have high durability. As a result, an oxidation catalyst of the present invention maintains a catalyst activity even when used under high temperature conditions, and even though thermal history is long, the catalyst can effectively purify (oxidize) an exhaust gas. That is, a precious metal can more preferably purify nitrogen oxide (NOx), carbon monoxide (CO), and hydrocarbon (HC) that is an unburned component of fuel such as gasoline or fuel of a diesel engine such as light oil and heavy oil, in particular, carbon monoxide (CO) and hydrocarbon (HC), in an exhaust gas at a low temperature.

Therefore, an oxidation catalyst produced by the method of the present invention has high durability and can effectively purify an exhaust gas, in particular, carbon monoxide (CO) and hydrocarbon (HC) in an exhaust gas even under a low temperature. Accordingly, the oxidation catalyst relating the present invention is effective particularly for purification of an exhaust gas from a diesel engine under a low temperature even when used under a high temperature condition.

Note that, in the oxidation catalyst of the present invention, the group 2 elements exert their effect only with specific contents. Therefore, the effect is not exhibited in the case of less than or more than the specific contents.

Embodiments of the present invention will be described below. Note that constituent elements and embodiments of the present invention will be specifically described in the following, but these are one part of examples of embodiments of the invention, and the invention is not limited to these contents.

<Oxidation Catalyst for Exhaust Gas Purification>

The oxidation catalyst for exhaust gas purification of the present invention is an oxidation catalyst for exhaust gas purification containing a refractory inorganic oxide, and a catalyst component and a metal component which are supported on the refractory inorganic oxide, the catalyst component is platinum, or platinum and palladium, and the metal component is one or more selected from the group consisting of magnesium, calcium, strontium and barium. Further, the oxidation catalyst for exhaust gas purification of the present invention is preferably in an embodiment that the catalyst component and the metal component are supported on the refractory inorganic oxide simultaneously, or in an embodiment that the catalyst component and the metal component are supported on the refractory inorganic oxide one by one in turn. The oxidation catalyst for exhaust gas purification of the present invention is preferably in an embodiment that the refractory inorganic oxide, and the catalyst component and the metal component which are supported on the refractory inorganic oxide are supported on a three-dimensional structure. Hereinafter, when the present specification describes "per 1 L of a catalyst", the description indicates per 1 L-volume of a catalyst obtained by supporting the refractory inorganic oxide, the catalyst component, the metal component, and the like on a three-dimensional structure.

Firstly, constituting components of the oxidation catalyst for exhaust gas purification of the present invention will be described below.

1. Refractory Inorganic Oxide

The oxidation catalyst for exhaust gas purification of the present invention contains a refractory inorganic oxide. The refractory inorganic oxide preferably acts as a carrier that supports a catalyst component (platinum, or platinum and palladium). The refractory inorganic oxide may exist in a form as it is. In a preferable embodiment, the refractory inorganic oxide is supported on a three-dimensional structure with a catalyst component and a metal component which are supported on the refractory inorganic oxide.

A refractory inorganic oxide used in the present invention is not particularly limited as long as it is a catalyst that is generally used for internal combustions. Specifically, a refractory inorganic oxide used in the present invention may be any one that is generally used as a catalyst carrier, and examples thereof include activated alumina such as α-alumina, γ-alumina, δ-alumina, η-alumina and θ-alumina, single oxides such as titania, zirconia, and silicon oxide (silica), composite oxides or fine mixtures such as alumina-titania, zirconia-alumina, titania-zirconia, zeolite, silica-titania, silica-zirconia, silica-alumina, and lanthanum-alumina, and mixtures thereof. From the viewpoint of supporting platinum, or platinum and palladium, more preferable examples include alumina, zirconia-alumina, silica-alumina, and lanthanum-alumina. Furthermore preferable examples include zirconia-alumina, silica-alumina, and lanthanum-alumina. When silica-alumina is used in this time, a content of silica is not particularly limited, but particularly preferably used silica-alumina contains a silica content of preferably 0.1 to 10% by mass, more preferably 1 to 8% by mass, and further more preferably 2 to 7% by mass. When zirconia-alumina is used, a zirconia content is not particularly limited, but particularly preferably used zirconia-alumina contains a zirconia content of 2 to 15% by mass. When lanthanum-alumina is used, a lanthanum content is not particularly limited, but particularly preferably used lanthanum-alumina contains a lanthanum content of 0.1 to 10% by mass.

The refractory inorganic oxide may be used solely, or in a form of mixture of two or more kinds.

An embodiment of the refractory inorganic oxide is not particularly limited, but the following embodiment is preferable. For example, a BET (Brunauer-Emmett-Teller) specific surface area of the refractory inorganic oxide is not particularly limited, but the specific surface area is preferably large. The specific surface area is preferably 30 to 350 $m^2/g$, more preferably 70 to 250 $m^2/g$, and further more preferably 75 to 200 $m^2/g$. A pore volume of refractory inorganic oxide powder is not particularly limited, but is preferably 0.2 to 3 mL/g, more preferably 0.3 to 2 mL/g, and further more preferably 0.5 to 1.5 mL/g. An average particle diameter of refractory inorganic oxide powder is also not particularly limited, but is preferably 0.5 to 150 μm, more preferably 1 to 100 μm, and further more preferably 2 to 50 μm in consideration of uniformity of a slurry. Note that the "average particle diameter" in the present specification means an average value of a particle diameter of refractory inorganic oxide powder, which is measured in a known method such as a laser diffraction method and a dynamic light scattering method.

A use amount (supported amount) of the refractory inorganic oxide is not particularly limited. The use amount (supported amount) of the refractory inorganic oxide is preferably 20 to 300 g, and more preferably 60 to 250 g per 1 liter (L) of a catalyst (for example, a three-dimensional structure). When the use amount is less than 20 g, a catalyst component (platinum, or a component of platinum and palladium) cannot be sufficiently dispersed, and there is a possibility of insufficient catalytic performance and thermal durability. On the contrary, when the use amount exceeds 300 g, an effect appropriate for addition of the refractory inorganic oxide is not observed, an effect of the catalyst component cannot be sufficiently exerted, and there is a possibility that an activity decreases or a pressure loss becomes large.

It is preferable to have a catalyst (three-dimensional structure) further support a refractory inorganic oxide in a form as it is in the oxidation catalyst for exhaust gas purification of the present invention. The refractory inorganic oxide to be supported herein may also support precious metals, iron, copper, cerium, and the like. Hereinafter, "a refractory inorganic oxide (supported component)" indicates the refractory inorganic oxide supported on the catalyst (three-dimensional structure) in a form as it is. A supporting time of such a refractory inorganic oxide (supported component) is not particularly limited, but after supporting a catalyst component is preferable, and after supporting a metal component is more preferable.

For the refractory inorganic oxide (supported component), for example, single oxides and complex oxides described in the above refractory inorganic oxide can be used. Among them, single oxides such as zeolite, γ-alumina, silica, titania, zirconia and ceria, complex oxides or fine mixtures such as silica-alumina, lanthanum-alumina, zirconia-alumina and ceria-zirconia, and mixtures of these compounds are preferably used. Zeolite is more preferable, and β-zeolite is further more preferable. Zeolite is an adsorbent of hydrocarbon and can adsorb heavy hydrocarbon (HC) that is discharged at a low temperature before the catalyst is activated. In this time, when β-zeolite is used, a molar ratio of silica and alumina (silica/alumina molar ratio) is not particularly limited, but particularly preferably used zeolite has the molar ratio of preferably 15 to 500, more preferably 20 to 250, and further more preferably 25 to 200. The above described refractory inorganic oxide may be used solely or in a form of a mixture of two or more kinds.

An embodiment of the refractory inorganic oxide (supported component) is not particularly limited and the following embodiment is preferable. For example, a BET (Brunauer-Emmett-Teller) specific surface area of the refractory inorganic oxide (supported component) is not particularly limited and is preferably large. The BET is preferably 100 to 650 $m^2/g$, more preferably 150 to 600 $m^2/g$, and further more preferably 200 to 550 $m^2/g$. The average particle diameter of the refractory inorganic oxide powder (supported component) is also not particularly limited, and is preferably 0.1 to 10 μm, more preferably 0.2 to 5 μm, and further more preferably 0.3 to 3 μm, in consideration of uniformity of a slurry.

When the refractory inorganic oxide (supported component) is contained, a use amount (supported amount) of the refractory inorganic oxide (supported component) is preferably 1 to 250 g, more preferably 10 to 150 g, and further more preferably 15 to 100 g, per 1 liter (L) of a catalyst (for example, three-dimensional structure). When the refractory inorganic oxide (supported component) is contained within the range, performance and a cost are appropriate as an adsorbent of heavy hydrocarbon. Note that the supported amount does not include of a supported amount of a refractory inorganic oxide as a carrier described above and is an amount of a refractory inorganic oxide that is separately supported on a three-dimensional structure.

2. Catalyst Component (Platinum or Platinum and Palladium)

The oxidation catalyst for exhaust gas purification of the present invention contains platinum, or platinum and palladium as a catalyst component. Hereinafter, "platinum, or platinum and palladium" may be referred to simply as "a catalyst component", "platinum" may be referred to as "Pt", palladium may be referred to as "Pd", and "platinum, or platinum and palladium" may be referred to as "Pt or Pt/Pd".

Platinum, or platinum and palladium of the present invention are supported on the above described refractory inorganic oxide that is a carrier. A method of supporting on a refractory inorganic oxide will be described in a method for preparing a catalyst in the following. In addition, when platinum and palladium are used as catalyst components in the present invention, platinum and palladium are simultaneously supported on a refractory inorganic oxide. In the present specification, "simultaneously supported" means that at least a part of platinum and palladium is supported on the same carrier. More specifically, it means that platinum and palladium are supported at the same time.

A supported amount (use amount) of a catalyst component (platinum, or platinum and palladium) on a refractory inorganic oxide is not particularly limited and can be suitably selected according to a concentration of a toxic component to be purified (removed). Note that a supported amount in the case of using platinum and palladium in combination as the catalyst components in the present invention means a total amount of platinum and palladium. Specifically, a supported amount (use amount; precious metal (Pt, Pd) conversion) of a catalyst component (platinum, or platinum and palladium) can be used in an amount of preferably 0.1 to 10% by mass, more preferably 0.3 to 8% by mass, further more preferably 0.5 to 5% by mass, and particularly preferably 1 to 3% by mass with respect to a refractory inorganic oxide. A toxic component can be sufficiently purified (removed) when the use amount is within such a range. In the present invention, platinum and palladium are preferably used as the catalyst components in a mixing ratio of platinum and palladium (Pt, Pd conversion, respectively) of 1/0 to 1/1 in a mass ratio. Note that a mass ratio of platinum and palladium of 1/0 means that palladium is not contained.

When the catalyst components are platinum and palladium, platinum/palladium (metal mass ratio) is preferably 40/1 to 1/1. That is, when platinum and palladium are used in combination, a mass ratio (precious metal conversion) of platinum and palladium is preferably 40/1 to 1/1, more preferably 20/1 to 1/1, further more preferably 4/1 to 1/1, and particularly preferably 2/1 to 1/1. The oxidation catalyst for exhaust gas purification of the present invention is sufficiently excellent in oxidation performance under a low temperature even when only platinum is used as the catalyst component. When platinum and palladium are used in combination as the catalyst component, the oxidation catalyst of the present invention is sufficiently excellent in oxidation performance under a low temperature. An advantage of using platinum and palladium in combination includes the fact that palladium is inexpensive as compared to platinum. The oxidation catalyst for exhaust gas purification of the present invention can keep performance by adding palladium even when an amount of platinum as a catalyst component is decreased. Therefore, decrease of the platinum amount leads to cost reduction. When platinum and palladium are used in combination, a mass ratio within the range from 40/1 to 1/1 is preferable since an effect appropriate for its cost is exerted.

When platinum and palladium are used in combination, a component obtained by alloying of platinum and palladium is preferable. Herein, alloying means that platinum and palladium are present in the same particle under an electron microscope, and the platinum and palladium may be uniformly dispersed with regularity. A method of alloying is not particularly limited, and for example, a component obtained by mixing a compound that contains platinum and a compound that contains palladium to have a ratio within the above described range may be used. That is, a catalyst component prepared in a method in examples described below is preferable; the catalyst component is obtained by impregnating a carrier with a solution containing platinum and palladium, thereby supporting a component obtained by alloying of platinum and palladium on the carrier.

As an embodiment of supporting a catalyst component on a refractory inorganic oxide in the present invention, an embodiment of simultaneously supporting a catalyst component and a metal component on a refractory inorganic oxide is also preferable other than an embodiment of supporting only a catalyst component on a refractory inorganic oxide. The number of supporting a catalyst component on a refractory inorganic oxide is preferably once. Note that in the specification "simultaneously supported" means that at least apart of a catalyst component and a metal component is supported on the same carrier. More specifically, it means that a catalyst component and a metal component are supported at the same time.

A supported amount (use amount) of a catalyst component (platinum, or platinum and palladium) on a catalyst (three-dimensional structure) is not particularly limited and can be suitably selected according to a concentration of a toxic component to be purified (removed). Specifically, a use amount (a supported amount; precious metal (Pt, Pd) conversion) of a catalyst component (platinum, or platinum and palladium) is preferably 0.1 to 10 g, and more and preferably 0.3 to 7 g per 1 liter (L) of the catalyst (three-dimensional structure). A toxic component can be sufficiently purified (removed) when the use amount is within such a range. Note that a supported amount in the case of using platinum and palladium in combination as the catalyst components means a total amount of platinum and palladium in the present invention.

3. Metal Component

In the oxidation catalyst for exhaust gas purification of the present invention, one or more elements selected from the group consisting of magnesium, calcium, strontium and barium is used as a metal component. The metal component is preferably a metal, or a carbonate or an oxide of the metal. The oxidation catalyst of the present invention further preferably contains carbonates or oxides of one or more metals selected from the group consisting of magnesium, calcium, strontium and barium.

Hereinafter "one or more elements selected from the group consisting of magnesium, calcium, strontium and barium" may also be referred to simply as "the metal components". In addition, as typical examples of the metal components, metals, or carbonates or oxides of the metals will be described.

For metals, one or more metals selected from the group consisting of magnesium, calcium, strontium and barium, or carbonates or oxides of the metals are preferable. Examples of the carbonates include magnesium carbonate ($MgCO_3$), calcium carbonate ($CaCO_3$), strontium carbonate ($SrCO_3$) and barium carbonate ($BaCO_3$), and examples of the oxides include magnesium oxide (MgO), calcium oxide (CaO), strontium oxide (SrO) and barium oxide (BaO). Among these metals, preferably, magnesium oxide, calcium oxide, strontium oxide, barium oxide, and barium carbonate are used, and strontium oxide and barium carbonate are more preferable.

As a preferable embodiment, the metal component of the present invention is supported on the above described refractory inorganic oxide that is a carrier. A more preferable embodiment of the oxidation catalyst for exhaust gas purification of the present invention include an embodiment in which a metal component is supported on a refractory inorganic oxide simultaneously with a catalyst component, or an embodiment in which a metal component is supported on a refractory inorganic oxide on which a catalyst component is supported. As the embodiment in which a metal component is supported on a refractory inorganic oxide on which a catalyst component is supported, the number of supporting the metal component is more preferably once. A method of supporting on a refractory inorganic oxide will be described in a method for preparing a catalyst in the following.

A supported amount (use amount) of the metal component (one or more elements selected from the group consisting of magnesium, calcium, strontium and barium, for example, metals of the above described elements, or carbonates or oxides of the metals) on a refractory inorganic oxide is not particularly limited and can be suitably selected according to a concentration of a toxic component to be purified (removed). Note that a supported amount as the metal components means a total amount of the metal components in the present invention. A supported amount (use amount; metal (e.g., Mg) conversion) of the metal components, which can be used, is, for example, preferably 0.01 to 30% by mass, and more preferably 0.01 to 20% by mass, with respect to a refractory inorganic oxide. Specifically, the following amounts of respective metal components are supported.

When magnesium, magnesium carbonate or magnesium oxide is supported on a refractory inorganic oxide, a magnesium supported amount is preferably 0.01 to 3% by mass, more preferably 0.02 to 2.5% by mass, further more preferably 0.05 to 2.3% by mass, particularly preferably 0.1 to 2% by mass, and the most preferably 0.2 to 1.8% by mass with respect to the refractory inorganic oxide in Mg conversion.

When calcium, calcium carbonate or calcium oxide is supported on a refractory inorganic oxide, a calcium supported amount is preferably 0.01 to 5% by mass, more preferably 0.02 to 4.5% by mass, further more preferably 0.05 to 4% by mass, particularly preferably 0.1 to 3.5% by mass, and the most preferably 0.2 to 2.5% by mass with respect to the refractory inorganic oxide in Ca conversion.

When strontium, strontium carbonate or strontium oxide is supported on a refractory inorganic oxide, a strontium supported amount is preferably 0.01 to 12% by mass, more preferably 0.05 to 10% by mass, further more preferably 0.1 to 8% by mass, particularly preferably 0.2 to 7% by mass, and the most preferably 0.5 to 5% by mass with respect to the refractory inorganic oxide in Sr conversion.

When barium, barium carbonate or barium oxide is supported on a refractory inorganic oxide, a barium supported amount is preferably 0.001% by mass or more, more preferably 0.01% by mass or more, further more preferably 0.015% by mass or more, particularly preferably 0.1% by mass or more, and the most preferably 0.2% by mass or more with respect to the refractory inorganic oxide in Ba conversion. The upper limit in this case is preferably 30% by mass or less, and more preferably 20% by mass or less.

When respective metals are within the above described ranges, a toxic component can be sufficiently removed (purified) and the catalyst is particularly effective for purification under a low temperature.

A supported amount (use amount) of the metal components (metals, or carbonates or oxides of the metals) on a catalyst (three-dimensional structure) is not particularly limited and can be suitably selected according to a concentration of a toxic component to be purified (removed). A supported amount (use amount; metal (e.g., Mg) conversion) of the metal components, which can be used, is preferably 0.001 to 0.12 mol, and more preferably 0.005 to 0.1 mol per 1 liter (L) of the catalyst (three-dimensional structure) as a preferable embodiment in the present invention, but the amount is preferably suitably selected depending on a metal to be used. The above described metals can be used solely or in combination of two or more metals. The supported amount means a total amount when two or more metals are used in combination. Specifically, the following amounts of respective metal components are supported.

When magnesium, magnesium carbonate or magnesium oxide is supported on a catalyst (three-dimensional structure), a magnesium supported amount is preferably 0.001 to 0.12 mol, more preferably 0.005 to 0.1 mol, further more preferably 0.01 to 0.09 mol, particularly preferably 0.015 to 0.08 mol, and the most preferably 0.02 to 0.075 mol per 1 liter (L) of the catalyst (three-dimensional structure) in Mg conversion.

When calcium, calcium carbonate or calcium oxide is supported on a catalyst (three-dimensional structure), a calcium supported amount is preferably 0.001 to 0.12 mol, more preferably 0.005 to 0.1 mol, further more preferably 0.01 to 0.09 mol, particularly preferably 0.015 to 0.08 mol, and the most preferably 0.02 to 0.055 mol per 1 liter (L) of the catalyst (three-dimensional structure) in Ca conversion.

When strontium, strontium carbonate or strontium oxide is supported on a catalyst (three-dimensional structure), a strontium supported amount is preferably 0.001 to 0.12 mol, more preferably 0.005 to 0.1 mol, further more preferably 0.01 to 0.09 mol, particularly preferably 0.015 to 0.08 mol, and the most preferably 0.02 to 0.055 mol per 1 liter (L) of the catalyst (three-dimensional structure) in Sr conversion.

When barium, barium carbonate or barium oxide is supported on a catalyst (three-dimensional structure), a barium supported amount is preferably 0.001 mol or more, more preferably 0.005 mol or more, further more preferably 0.01 mol or more, particularly preferably 0.015 mol or more, and the most preferably 0.02 mol or more per 1 liter (L) of the catalyst (three-dimensional structure) in Ba conversion. The upper limit in this case is preferably 0.2 or less, more preferably 0.15 or less, further more preferably 0.12 or less, and particularly preferably 0.1 or less.

When respective metals are within the above described ranges, a toxic component can be sufficiently removed (purified) and the catalyst is particularly effective for purification under a low temperature.

4. Others

The oxidation catalyst for exhaust gas purification of the present invention may be added with other components in addition to the above described refractory inorganic oxide, catalyst components (platinum, or platinum and palladium), and metal components (one or more elements selected from the group consisting of magnesium, calcium, strontium and barium, for example, metals of the above described elements, or carbonates or oxides of the metals). Such additive components are not particularly limited, and examples thereof include alkali metals, rare earth elements and manganese, and oxides of these substances. Examples of the alkali metals used herein include sodium, potassium, rubidium, and cesium. Examples of the rare earth elements used herein include, for example, cerium, lanthanum, praseodymium, neodymium, samarium, europium, gadolinium, terbium, dysprosium, holmium, and erbium. The additive components described above may be added in a metal form as it is, or in a form of an oxide. The additive components described above may be used in a metal form as it is, but is preferably supported on a refractory inorganic oxide. In this time, addition of rare earth elements such as lanthanum, cerium and neodymium and oxides thereof enables improvement in heat resistance. The alkali metals and rare earth elements can adsorb nitrogen oxides (NOx). Herein, the above described additive components may be used solely or in a mixture of two or more components. A supported amount (use amount) of an additive component is not particularly limited. A supported amount (use amount) of an additive component to a refractory inorganic oxide is not particularly limited, and can be suitably selected according to a concentration of a toxic component to be purified (removed). Note that a supported amount as an additive component in the present invention means a total amount of the additive component. A supported amount (use amount; oxide conversion) of an additive component, which can be used, is, for example, preferably 0.1 to 10% by mass, and more preferably 0.3 to 5% by mass with respect to a refractory inorganic oxide. A supported amount (use amount; oxide conversion) of an additive component, which can be used, is, preferably 1 to 100 g, and more preferably 1 to 50 g per 1 liter (L) of the catalyst (the three-dimensional structure).

<Method for Producing Oxidation Catalyst for Exhaust Gas Purification>

A method for preparing the oxidation catalyst for exhaust gas purification of the present invention is not particularly limited and, for example, the following method is exemplified.

A carrier obtained in a known method is used as the carrier of the present invention (refractory inorganic oxide) and a commercially available one can be used.

A method of supporting a catalyst component and a metal component on a carrier (refractory inorganic oxide) is not particularly limited, and the catalyst component and the metal component may be supported simultaneously (at the same time) or supported separately. When a catalyst component and a metal component are supported separately, as the number of supporting, each of the components may be supported once or plural times. In addition, an order of supporting a catalyst component and a metal component is also not particularly limited, and examples include (a) an order of a catalyst component and a metal component, (b) an order of a metal component and a catalyst component, (c) an order of a catalyst component, a metal component, and a catalyst component, (d) an order of a catalyst component, a catalyst component, and a metal component, (e) an order of a catalyst component, a metal component, and a metal component, and (f) an order of a metal component, a metal component, and a catalyst component. Among these methods, a method of simultaneously supporting, (a) a method of supporting a catalyst component and a metal component in this order one by one and (c) a method of supporting a catalyst component, a metal component, and a catalyst component in this order are preferable, and a method of simultaneously supporting and (a) a method of supporting a catalyst component and a metal component in this order one by one are more preferable.

In a preferable embodiment of the oxidation catalyst for exhaust gas purification of the present invention, a refractory inorganic oxide on which a catalyst component and a metal component are supported is further supported on a three-dimensional structure.

In a method of supporting a catalyst component (platinum, or platinum and palladium) and a metal component (one or more elements selected from the group consisting of magnesium, calcium, strontium and barium, for example, metals of the above described elements, or carbonates or oxides of the metals) on a carrier (refractory inorganic oxide), an aqueous solution containing a compound (material) of a catalyst component (Pt or Pt/Pd), and an aqueous solution of a compound (material) of a metal component (one or more elements selected from the group consisting of magnesium, calcium, strontium and barium, for example, metals of the above described elements, or carbonates or oxides of the metals) are preferably used. Specifically, the methods described below are included.

(1) A method in which a carrier (a refractory inorganic oxide) is added to an aqueous solution of a compound (material) of a catalyst compound (Pt or Pt/Pd) and sufficiently mixed, then dried, and calcined, if necessary, to obtain powder of a catalyst component-supported carrier (hereinafter also referred to as "Pt or Pt/Pd-supported carrier"); an aqueous solution of a compound (material) of a metal component is added to the powder of the Pt or Pt/Pd-supported carrier and sufficiently mixed, then dried, and calcined, if necessary, to obtain powder of a catalyst component and metal component-supported carrier (hereinafter also referred to as "(Pt or Pt/Pd) M-supported carrier"); further, the powder of the (Pt or Pt/Pd) M-supported carrier and, if necessary, a refractory inorganic oxide (supported component) are mixed in water, the mixture is wet milled to form an aqueous slurry, and the aqueous slurry is coated on a three-dimensional structure, then dried and, if necessary, calcined to prepare a complete catalyst.

(2) A method in which a carrier (a refractory inorganic oxide) is added to a mixture solution of an aqueous solution of a compound (material) of a catalyst component (Pt or Pt/Pd) and an aqueous solution of a compound (material) of a metal component and sufficiently mixed, then dried, and calcined, if necessary, to obtain powder of a catalyst component and metal component-supported carrier (hereinafter also referred to as "(Pt or Pt/Pd) M-supported carrier"); further, the (Pt or Pt/Pd) M-supported carrier and, if necessary, a refractory inorganic oxide (supported component) are mixed in water, the mixture is wet milled to form an aqueous slurry, and the aqueous slurry is coated on a three-dimensional structure, then dried, and if necessary calcined to prepare a complete catalyst.

(3) A method in which a carrier (a refractory inorganic oxide) is added to an aqueous solution of a compound (material) of a catalyst component (Pt, Pd or Pt/Pd) and sufficiently mixed, then dried, and calcined, if necessary, to obtain powder of a catalyst component-supported carrier (hereinafter also referred to as "Pt or Pd-supported carrier"); an aqueous solution of a compound (material) of a metal component is added to the powder of the Pt or Pd-supported carrier and sufficiently mixed, then dried, and calcined, if necessary, to obtain powder of a catalyst component and metal component-supported carrier (hereinafter also referred to as "(Pt or Pd) M-supported carrier"); further, the powder of the (Pt or Pd) M-supported carrier, an aqueous solution of a compound (material) of a catalyst component (Pt, Pd or Pt/Pd) and, if necessary, a refractory inorganic oxide (supported component) are mixed in water, the mixture is wet milled to form an aqueous slurry, and the aqueous slurry is coated on a three-dimensional structure, then dried, and if necessary calcined to prepare a complete catalyst.

Note that an aqueous solution of a compound (material) of a catalyst component (Pt or Pt/Pd) means an aqueous solution containing a compound (material) of Pt in the case of only platinum as a catalyst component. When platinum and palladium are used in a combination as catalyst components, the aqueous solution of a compound (material) of a catalyst component means an aqueous solution containing a compound (material) of Pt and a compound (material) of Pd, the aqueous solution in this case may be a mixed solution of an aqueous solution of a compound (material) of Pt and an aqueous solution of a compound (material) of Pd, or an aqueous solution obtained by dissolving a compound (material) of Pt and a compound (material) of Pd in the same solution. For the aqueous solution of a compound (material) of the catalyst component (Pt, Pd or Pt/Pd) used in (3), an aqueous solution used in each supporting step may be selected from aqueous solutions of compounds (materials) of Pt, Pd or Pt/Pd so that a catalyst component contained in a catalyst that is finally obtained as a catalyst component is Pt or Pt/Pd.

In a method of supporting the above described catalyst components and metal components on a carrier in the present invention, for effects as described above, that is, in order that the metal components suppress aggregation of the catalyst components, the catalyst is preferably produced in the method (1) in which a catalyst component is supported on a carrier and then calcined to form powder, and a metal component is further supported on the carrier and calcined, or the method (2) in which a catalyst component and a metal component are simultaneously supported and calcined.

That is, the method for producing a oxidation catalyst for exhaust gas purification of the present invention includes a step of adding a solution that contains a water-soluble precious metal salt being a material of the catalyst component and a water-soluble metal salt being a material of the metal component to a refractory inorganic oxide to be mixed, and obtaining a catalyst component and metal component-supported carrier, or each one step of a step of adding a solution that contains a water-soluble precious metal salt being a material of the catalyst component to a refractory inorganic oxide to be mixed and obtaining a catalyst component-supporting carrier and a step of adding a solution that contains a water-soluble metal salt being a material of the metal component to the catalyst component-supported carrier to be mixed and obtaining a catalyst component and metal component-supported carrier. The method for producing the oxidation catalyst for exhaust gas purification of the present invention preferably further includes a step of preparing a slurry that contains the catalyst component and metal component-supported carrier and a refractory inorganic oxide (supported component), and coating the slurry on a three-dimensional structure.

A compound of a catalyst component used in the above described preparation method is not particularly limited, and platinum, or platinum and palladium may be added in a form as it is or in another form and then converted into a desired form (a form of Pt, or Pt and Pd). In the present invention, since a compound of platinum, or a compound of platinum and a compound of palladium are added to an aqueous medium, platinum, or platinum and palladium are preferably added in other forms, particularly, in a form of a water-soluble precious metal salt. Hereinafter, a compound of a catalyst component (platinum, or platinum and palladium) is also referred to as "a water-soluble precious metal salt". Herein, the water-soluble precious metal salt is not particularly limited and materials used in the field of exhaust gas purification can be used. Specifically, for example, in the case of platinum, examples include platinum; halides such as platinum bromide and platinum chloride; inorganic salts such as a dinitrodiammine salt, a hexammine salt, a hexahydroxo acid salt, a tetraammine salt, a tetranitro acid salt of platinum; carboxylates such as acetate of platinum; hydroxides of platinum, alkoxides of platinum, and oxides of platinum. Preferable examples include a dinitrodiammine salt, a hexammine salt, a hexahydroxo acid salt, and a tetraammine salt, and more preferable examples include a dinitrodiammine salt (dinitrodiammine platinum) and a tetraammine salt. Examples in the case of palladium include palladium; halides such as palladium chloride; inorganic salts such as nitrate and sulfate, a dinitrodiammine salt, a hexammine salt, a tetraammine salt, and a hexacyano acid salt of palladium; carboxylates such as acetate of palladium; and hydroxides of palladium, alkoxides of palladium, and oxides of palladium. Preferable examples include nitrates, a hexammine salt, a tetraammine salt, and more preferable examples include nitrates (palladium nitrate), and a tetrammine salt. Note that the above described compounds of platinum and palladium (platinum and palladium sources) each may be used in a single compound, or in a mixture of two or more compounds in the present invention.

A use amount (supported amount) of a compound of platinum, or platinum and palladium is not particularly limited, and can be suitably selected according to a concentration of a toxic component to be purified (removed). Specifically, it is an amount such as the above described use amount of platinum, or platinum and palladium (a supported amount; precious metal conversion).

A compound (material) of a metal component (metals, or carbonate or oxide of the metals), which is used in the above described preparation method, is not particularly limited, and metals, or carbonates or oxides of the metals may be added in a form as they are, or in another form and then converted into a desired form (for example, a form of metals, or carbonates or oxides of the metals). In the present invention, a compound of a metal component (metals, or carbonates or oxides of the metals) is added to an aqueous medium and thus preferably added in another form, in particular, a form of a water-soluble precious metal salt. Hereinafter, a compound of a metal component (metals, or carbonates or oxides of the metals) is also referred to as "a water-soluble metal salt". Herein, the water-soluble metal salt is not particularly limited, and materials used in the field of exhaust gas purification can be used. Specific examples include, in the case of magnesium, magnesium; halides such as magnesium chloride; inorganic salts such as nitrates, carbonates, and sulfates of magnesium; carboxylates such as acetate of magnesium; and hydroxides, alkoxides, and oxides of magnesium. Preferable examples include nitrates and acetate, and more preferable examples include nitrates (magnesium nitrate). Examples in the case of calcium include calcium; halides such as calcium chloride; inorganic salts such as nitrates, sulfates, and carbonates of calcium; carboxylates such as acetate of calcium; and hydroxides, alkoxides, and oxides of calcium. Preferable examples include nitrates and acetate, and more preferable examples include nitrates (calcium nitrate). Examples in the case of strontium include strontium; halides such as strontium chloride; inorganic salts such as nitrates, sulfates, and carbonates of strontium; carboxylates such as acetate of strontium; and hydroxides, alkoxides, and oxides of strontium. Preferable examples include nitrates and acetate, and more preferable examples include nitrates (strontium nitrate). Examples in the case of barium include barium; halides such as barium chloride; inorganic salts such as nitrates and carbonates of barium; carboxylates such as acetate of barium; and hydroxides, alkoxides, and oxides of barium. Preferable examples include nitrates and acetate, and more preferable examples include nitrates (barium nitrate). Note that the above described compounds of metal components (metal component sources) each may be used in a single compound, or in a mixture of two or more compounds in the present invention.

A use amount (supported amount) of a metal compound of a metal component is not particularly limited, and can be suitably selected according to a concentration of a toxic component to be purified (removed). Specifically, it is such a use amount (supported amount; metal conversion) of the above described metal component.

For a solvent that uniformly dissolves the above described water-soluble precious metal salt and water-soluble metal salt, water, alcohol, and a mixture of water and alcohol can be used. For the alcohol, ethanol, 1-propanol, or 2-propanol can be used. A concentration (content) of the water-soluble metal salt in a solvent is not particularly limited and can be suitably selected according to amounts of supporting a catalyst component and a metal component. For example, a content of a water-soluble precious metal salt or a water-soluble metal salt in a solution is preferably 0.01 to 80% by mass.

As a preferable embodiment of supporting a catalyst component on a carrier, the following method is exemplified. A carrier (a refractory inorganic oxide) is added to an aqueous solution of the above described water-soluble precious metal salt and sufficiently mixed, then dried at 80 to 200° C. for 1 to 20 hours, and the obtained product is further calcined in the atmosphere at 100 to 1200° C., preferably 300 to 1100° C., more preferably 400 to 1000° C., for 1 to 20 hours to thus obtain powder of a Pt or Pt/Pd-supported carrier. Calcining may be carried out in an inert gas flow such as nitrogen gas before calcining in the atmosphere.

In addition, as a preferable embodiment of supporting a metal component on a Pt or Pt/Pd-supported carrier, the following method is exemplified. Powder of a Pt or Pt/Pd-supported carrier is added to an aqueous solution of a water-soluble metal salt, sufficiently mixed, and then dried at 80 to 200° C. for 1 to 20 hours. The obtained product is further calcined in the atmosphere at 100 to 1200° C., preferably 300 to 1100° C., more preferably 400 to 1000° C., for 1 to 20 hours to thus obtain powder of a (Pt or Pt/Pd) M-supported carrier (M denotes magnesium, calcium, strontium, or barium.)

In a preferable embodiment in the present invention, a refractory inorganic oxide on which a catalyst component and a metal component are supported ((Pt or Pt/Pd) M-supported carrier) and a refractory inorganic oxide (supported component) are supported on a three-dimensional structure.

A method of supporting the (Pt or Pt/Pd) M-supported carrier obtained in the above described method and a refractory inorganic oxide (supported component) on a three-dimensional structure is not particularly limited, but supporting in wet milling is preferable. Wet milling is generally carried out in a known method, not particularly limited, but a ball mill and the like is preferably used. Alternatively, conventionally known techniques such as an attritor, a homogenizer, an ultrasonic disperser, a sand mill, a jet mill, and a bead mill can be used. Herein, wet milling conditions are not particularly limited. For example, a temperature in wet milling is usually at 5 to 40° C., preferably around at room temperature (25° C.). In addition, a wet milling time is generally from 10 minutes to 20 hours. Note that the wet milling time differs depending on wet milling equipment to be used, and for example, when equipment having high milling efficiency, such as an attritor, is used, the wet milling time is about 10 to 60 minutes, and when a ball mill or the like is used, the wet milling time is about 5 to 20 hours. In addition, as a solvent used in wet milling, water, alcohols such as ethanol, 1-propanol and 2-propanol can be used, and water is particularly preferable. Concentrations (contents) of supported components ((Pt or Pt/Pd) M-supported carrier and refractory inorganic oxide (supported component)) in a solvent during wet milling are not particularly limited and can be suitably selected according to amounts of supporting the (Pt or Pt/Pd) M-supported carrier and the refractory inorganic oxide (supported component). For example, the total content of the (Pt or Pt/Pd) M-supported carrier and the refractory inorganic oxide (supported component) in a solution is preferably 0.5 to 60% by mass.

As a method of coating the aqueous slurry obtained in wet milling described above on a three-dimensional structure, a three-dimensional structure is dipped in the aqueous slurry, an excessive slurry is removed, and calcined, and an oxidation catalyst for exhaust gas purification in which a catalyst component is supported on a three-dimensional structure can be thus produced. An immersion condition of charging and dipping a three-dimensional structure in an aqueous slurry is not particularly limited, as long as it is a condition of sufficiently uniformly contacting a carrier ((Pt/Pd) M-supported carrier) and a refractory inorganic oxide in an aqueous slurry into contact with a three-dimensional structure and sufficiently supporting these components on the three-dimensional structure in the next drying and calcining steps.

In such a method, the refractory inorganic oxide (supported component) supported on a three-dimensional structure may be any inorganic oxide as long as it is generally used as a catalyst for internal combustions without particular limitation, but as described above, zeolite that is an adsorbent of hydrocarbon is preferable. For the refractory inorganic oxide (supported component), those obtained in known methods are used and commercially available ones can be used, and specifically, the above described refractory inorganic oxide is added in a form as it is. A use amount (supported amount) of a refractory inorganic oxide (supported component) is not particularly limited and can be suitably selected according to a concentration of a toxic component to be purified (removed). Specifically, the use amount is to be the above described amount of a refractory inorganic oxide (supported component).

Herein, the three-dimensional structure is not particularly limited, and similar ones generally used for preparation of a catalyst for exhaust gas purification can be used. Examples thereof include refractory substances such as a honeycomb substrate, an integrally molded honeycomb structure (honeycomb carrier) is preferable and, for example, a monolith honeycomb substrate, a plug honeycomb substrate, and the like are included.

As a monolith substrate, generally, materials called ceramic honeycomb substrates may be used, in particular, honeycomb substrates which contain silicon carbide (SiC), cordierite, mullite, petalite, alumina ($\alpha$-alumina), silica, zirconia, titania, titanium phosphate, aluminum titanate, spodumene, aluminosilicate, magnesium silicate, zeolite, and the like, as materials are preferable, and among them, a honeycomb substrate made of cordierite is particularly preferable. Other than the above, honeycomb substrates obtained by forming an integral structure using heat-resistant metals with oxidization resistance such as stainless steel and Fe—Cr—Al alloy, so-called metal honeycomb substrates, are also used. A three-dimensional structure may be used in any type such as a flow-through type (open flow type) in which a gas can directly pass through, a filter type capable of filtering soot in an exhaust gas, or a plug type. In addition, being not a three-dimensional integral structure, a pellet carrier, and the like can be exemplified. Herein, the plug type honeycomb means a honeycomb having a large number of permeable pores and having open pores and close pores in a checkered pattern on the introduction face of a gas, in which when one permeable pore is an open pore, the other side of the same permeable pore is a close pore. The plug honeycomb substrate has fine pores on walls between respective pores, and an exhaust gas enters from open pores to the honeycomb and passes other pores through the fine pores to come outside the honeycomb.

These honeycomb substrates are produced in an extrusion molding method, a method of solidly winding a sheet-form element, or the like. A shape of a gas vent (cell form) may be any of hexagon, square, triangle, and a corrugation form. The cell density (the number of cells/unit cross sectional area) of 100 to 1200 cell/square inch is sufficiently usable, preferably 200 to 900 cell/square inch, and more preferably 300 to 600 cell/square inch.

As a preferable embodiment of supported a (Pt/Pd) M-supported carrier and a refractory inorganic oxide (supported component) on a three-dimensional structure, the following method is exemplified. A refractory inorganic oxide (supported component) is mixed in the (Pt/Pd) M-supported carrier powder obtained as described above, and the mixture is wet milled to form an aqueous slurry, the aqueous slurry is wash coated on a three-dimensional structure, and then dried at 0 to 200° C. for 1 minute to 3 hours. The obtained product is further cancined in the atmosphere at 100 to 1200° C., preferably 300 to 1100° C., more preferably 400 to 1000° C., for 1 to 20 hours, and furthermore, the three-dimensional structure is preferably treated in a stream of a reducing gas (for example, 5% of hydrogen and 95% of nitrogen) at a temperature of 200 to 800° C., preferably 300 to 700° C. for 1 to 10 hours, preferably 2 to 5 hours according to necessity, in the calcining step or after the calcining step. Herein, hydrogen gas, carbon monoxide gas, or the like can be used as a reducing gas, and hydrogen gas is preferable. For the reducing gas, one of the above described gases may be used solely, two of gases described above may be used in mixing, or one or two gases described above may be used in mixing with other gases. Use of the above described gases with other gases in mixing is preferable and use of hydrogen gas by diluting with nitrogen gas is more preferable. An adding amount of a reducing gas in this case is not particularly limited as long as it is an amount capable of treating a dried three-dimensional structure in a desired level, and an atmosphere of treating a three-dimensional structure preferably contains 1 to 10% by volume of a reducing gas, more preferably contains 3 to 5% by volume of a reducing gas. In addition, a condition of treating a dried three-dimensional structure with a reducing gas is not particularly limited. For example, a dried three-dimensional structure is preferably treated at 150 to 600° C. for 1 to 10 hours while the above described reducing gas is flown at 10 to 100 ml/minute.

In a method of supporting the above described catalyst component and metal component on a carrier in the present invention, even in the case of producing in the method (2), the materials, a method, conditions described in the above described production method in (1) can be suitably adopted. That is, an aqueous solution of a compound (material) of a catalyst component (Pt or Pt/Pd) and an aqueous solution of a compound (material) of a metal component are mixed, and a carrier (a refractory inorganic oxide) is added to the mixed solution and sufficiently mixed, dried, and if necessary, calcined to thus obtain powder of a catalyst component and metal component-supported carrier ((Pt or Pt/Pd)/M-supported carrier). For the aqueous solution of a compound of a catalyst component and the aqueous solution of a compound of a metal component in this method, the above described ones can be used, and for drying and caicining, the above described method can be adopted. Furthermore, the method described in (1) can be applied also to a method in which a refractory inorganic oxide (supported component) is mixed in powder of the obtained catalyst component and metal component-supported carrier ((Pt or Pt/Pd)/M-supported carrier), the mixture is wet milled to form an aqueous slurry, and the aqueous slurry is coated on a three-dimensional structure, then dried, and if necessary, calcined to obtain a complete catalyst. In addition, even in the case of producing in the method (3), the materials, method, conditions described in the production method in (1) can be suitably employed in the same manner.

As described above, the oxidation catalyst for exhaust gas purification of the present invention has thermal durability and is excellent in purification performance on nitrogen oxide (NOx), carbon monoxide (CO), and hydrocarbon (HC) that is an unburned component of fuel such as gasoline or fuel of a diesel engine such as light oil and heavy oil, in particular, carbon monoxide (CO) and hydrocarbon (HC), in an exhaust gas at a low temperature. Therefore, for the exhaust gas purification performance of the oxidation catalyst for exhaust gas purification of the present invention, for example, on carbon monoxide (CO), a temperature showing a 50% CO conversion is preferably 200° C. or less, more preferably 195° C. or less, further more preferably 190° C., and particularly preferably 180° C. or less. Note that a lower temperature limit of the 50% CO conversion is more preferable, but in order to constantly maintain the catalytic performance, it is preferably 140° C. or more. For the exhaust gas purification performance on hydrocarbon (HC), a temperature showing a 50% HC conversion is preferably 200° C. or less, more preferably 195° C. or less, further more preferably 190° C., and particularly preferably 180° C. or less. Note that a lower temperature limit of the 50% HC conversion is more preferable, but in order to constantly maintain the catalytic performance, it is preferably 140° C. or more. Note that measurements of the above described 50% CO conversion and 50% HC conversion are followed by methods in examples described later.

Accordingly, an oxidation catalyst for exhaust gas purification that is produced by the method of the present invention can be favorably used for purification of an exhaust gas (in particular, HC and CO) of internal combustions. Therefore, the catalyst according to the present invention can be favorably used for processing an exhaust gas containing a reducing gas in the exhaust gas of internal combustions and exerts an excellent effect on purification of hydrocarbon (HC) and carbon monoxide (CO) contained in the exhaust gas with a high reducing property in acceleration, and the like, from internal combustions such as particularly gasoline engine and diesel engine.

Therefore, the present invention also provides a method of exhaust gas purification, which includes bringing the oxidation catalyst for exhaust gas purification according to the present invention into contact with an exhaust gas.

The catalyst according to the present invention is used for purification of an exhaust gas from internal combustions such as gasoline engine and diesel engine, in particular, diesel engine, and an exhaust gas and a catalyst during purification are brought into contact at a spatial velocity of preferably 1,000 to 500,000 $hr^{-1}$, more preferably 5,000 to 150,000 $hr^{-1}$, at a gas linear velocity of preferably 0.1 to 8.5 m/sec, more preferably 0.2 to 4.2 m/sec.

The catalyst of the present invention is used for purification of an exhaust gas from internal combustions such as gasoline engine and diesel engine, in particular, diesel engine, and can favorably oxidize CO when CO in an exhaust gas is contained in an amount of, for example, preferably 10 to 50,000 vol ppm, more preferably 50 to 15,000 vol ppm, further more preferably 50 to 5,000 vol ppm in a lean atmosphere. Furthermore, the catalyst can favorably oxidize HC when HC in an exhaust gas is contained in an amount of, for example, preferably 10 to 50,000 vol ppm (carbon (Cl) conversion), more preferably 10 to 10,000 vol ppm, further more preferably 10 to 5,000 vol ppm in a lean atmosphere.

In addition, similar or different catalysts for exhaust gas purification may be arranged in a front step (inflow side) or a rear step (outflow side) of the catalyst according to the present invention.

EXAMPLES

Hereinbelow, the present invention will be described in further detail with reference to examples; however, the present invention is not limited only to these examples in the first place and can be carried out with addition of suitable changes within the range capable of conforming to the purposes described previously or later, and all of the changes are included in the technical range of the present invention. In addition, unless otherwise noted, "%" and "ppm" are based on mass in the following production examples.

Example 1

100.0 g of silica-alumina (BET specific surface area of 150 m²/g, pore volume of 0.8 mL/g, silica content of 5% by mass, average particle diameter of 6 μm) was impregnated with a mixed solution of 11.80 g of an aqueous dinitrodiammine platinum solution containing platinum in an amount that corresponds to 1.333 g and 4.70 g of a palladium nitrate solution containing palladium in an amount that corresponds to 0.667 g. Then, the silica-alumina powder impregnated with the platinum and palladium solution was dried at 120° C. for 8 hour, and the obtained powder was further calcined at 500° C. for 1 hour to thus obtain Pt/Pd-supported silica-alumina powder. This Pt/Pd-supported silica-alumina powder was further impregnated with an aqueous magnesium nitrate solution (5.24 g of magnesium nitrate hexahydrate was dissolved in 95 g of water) and then dried at 120° C. for 8 hours, and the powder was calcined at 500° C. for 1 hour to obtain (Pt/Pd) Mg-supported silica-alumina powder. In this step, magnesium is present in a form of magnesium oxide. The obtained (Pt/Pd) Mg-supported silica-alumina powder and 20 g of β-zeolite (silica/alumina molar ratio=35, surface area of 543 m²/g, average particle diameter of 0.6 μm) were mixed in 183 g of water and wet milled to obtain an aqueous slurry. A cordierite substrate (trade name "Celcor" manufactured by Corning Incorporated, the number of cells: 400 cells per 1 in² of cross-sectional area), which was cut out into a column shape with a diameter of 24 mm and a length of 67 mm (a volume of 0.0303 L), was dipped in this slurry, wash coated and dried at 150° C. for 5 minutes, then air calcined at 500° C. for 1 hour, and further treated at 500° C. for 3 hours under a stream with 5% by volume hydrogen and 95% by volume nitrogen to thus obtain a catalyst a coated with components of 1.333 g of platinum, 0.667 g of palladium, 0.497 g of magnesium, 100 g of silica-alumina and 20 g of β-zeolite per 1 L-volume of the substrate.

Catalysts b and c having different adding amounts of magnesium were produced in the same manner. Note that compositions of the catalysts b and c were the same as the catalyst a except for an amount of magnesium and the magnesium amounts were described in Table 1.

Example 2

100.0 g of silica-alumina (BET specific surface area of 150 m²/g, pore volume of 0.8 mL/g, silica content of 5% by mass, average particle diameter of 6 μm) was impregnated with a mixed solution of 11.80 g of an aqueous dinitrodiammine platinum solution containing platinum in an amount that corresponds to 1.333 g and 4.70 g of a palladium nitrate solution containing palladium in an amount that corresponds to 0.667 g. Then, the silica-alumina powder impregnated with the platinum and palladium solution was dried at 120° C. for 8 hour, and the obtained powder was further calcined at 500° C. for 1 hour to thus obtain Pt/Pd-supported silica-alumina powder. This Pt/Pd-supported silica-alumina powder was further impregnated with an aqueous calcium nitrate solution (4.83 g of calcium nitrate tetrahydrate was dissolved in 95 g of water) and then dried at 120° C. for 8 hours, and the powder was calcined at 500° C. for 1 hour to obtain (Pt/Pd) Ca-supported silica-alumina powder. In this step, calcium is present in a form of calcium oxide. The obtained (Pt/Pd) Ca-supported silica-alumina powder and 20 g of β-zeolite (silica/alumina molar ratio=35, surface area of 543 m²/g, average particle diameter of 0.6 μm) were mixed in 183 g of water and wet milled to obtain an aqueous slurry. A cordierite substrate (trade name "Celcor" manufactured by Corning Incorporated, the number of cells: 400 cells per 1 in² of cross-sectional area), which was cut out into a column shape with a diameter of 24 mm and a length of 67 mm (a volume of 0.0303 L), was dipped in this slurry, wash coated and dried at 150° C. for 5 minutes, then air calcined at 500° C. for 1 hour, and further treated at 500° C. for 3 hours under a stream with 5% by volume hydrogen and 95% by volume nitrogen to thus obtain a catalyst d coated with components of 1.333 g of platinum, 0.667 g of palladium, 0.820 g of calcium, 100 g of silica-alumina and 20 g of β-zeolite per 1 L-volume of the substrate.

Catalysts e, f and g having different adding amounts of calcium were produced in the same manner. Note that compositions of the catalysts e, f and g were the same as the catalyst d except for an amount of calcium and the calcium amounts were described in Table 2.

Example 3

100.0 g of silica-alumina (BET specific surface area of 150 m²/g, pore volume of 0.8 mL/g, silica content of 5% by mass, average particle diameter of 6 μm) was impregnated with a mixed solution of 11.80 g of an aqueous dinitrodiammine platinum solution containing platinum in an amount that corresponds to 1.333 g and 4.70 g of a palladium nitrate solution containing palladium in an amount that corresponds to 0.667 g. Then, the silica-alumina powder impregnated with the platinum and palladium solution was dried at 120° C. for 8 hour, and the obtained powder was further calcined at 500° C. for 1 hour to thus obtain Pt/Pd-supported silica-alumina powder. This Pt/Pd-supported silica-alumina powder was further impregnated with an aqueous strontium nitrate solution (4.32 g of strontium nitrate was dissolved in 95 g of water) and then dried at 120° C. for 8 hours, and the powder was calcined at 500° C. for 1 hour to obtain (Pt/Pd) Sr-supported silica-alumina powder. In this step, strontium is present in a form of strontium oxide. The obtained (Pt/Pd) Sr-supported silica-alumina powder and 20 g of β-zeolite (silica/alumina molar ratio=35, surface area of 543 m²/g, average particle diameter of 0.6 μm) were mixed in 183 g of water and wet milled to obtain an aqueous slurry. A cordierite substrate (trade name "Celcor" manufactured by Corning Incorporated, the number of cells: 400 cells per 1 in² of cross-sectional area), which was cut out into a column shape with a diameter of 24 mm and a length of 67 mm (a volume of 0.0303 L), was dipped in this slurry, wash coated and dried at 150° C. for 5 minutes, then air calcined at 500° C. for 1 hour, and further treated at 500° C. for 3 hours under a stream with 5% by volume hydrogen and 95% by volume nitrogen to thus obtain a catalyst h coated with components of 1.33 g of platinum, 0.667 g of palladium, 1.79 g of strontium, 100 g of silica-alumina and 20 g of β-zeolite per 1 L-volume of the substrate.

Catalysts i, j and k having different adding amounts of strontium were produced in the same manner. Note that compositions of the catalysts i, j and k were the same as the catalyst h except for an amount of strontium and the strontium amounts were described in Table 3.

Example 4

100.0 g of silica-alumina (BET specific surface area of 150 m²/g, pore volume of 0.8 mL/g, silica content of 5% by mass, average particle diameter of 6 μm) was impregnated with a mixed solution of 11.80 g of an aqueous dinitrodiammine platinum solution containing platinum in an amount that corresponds to 1.333 g and 4.70 g of a palladium nitrate solution containing palladium in an amount that corresponds to 0.667 g. Then, the silica-alumina powder impregnated with the platinum and palladium solution was dried at 120° C. for 8 hour, and the obtained powder was further calcined at 500° C. for 1 hour to thus obtain Pt/Pd-supported silica-alumina powder. This Pt/Pd-supported silica-alumina powder was further impregnated with an aqueous barium nitrate solution (3.56 g of barium nitrate was dissolved in 95 g of water) and then dried at 120° C. for 8 hours, and the powder was calcined at 500° C. for 1 hour to obtain (Pt/Pd) Ba-supported silica-alumina powder. In this step, barium is present in a form of barium carbonate or barium oxide. The obtained (Pt/Pd) Ba-supported silica-alumina powder and 20 g of β-zeolite (silica/alumina molar ratio=35, surface area of 543 m$^2$/g, average particle diameter of 0.6 μm) were mixed in 183 g of water and wet milled to obtain an aqueous slurry. A cordierite substrate (trade name "Celcor" manufactured by Corning Incorporated, the number of cells: 400 cells per 1 in$^2$ of cross-sectional area), which was cut out into a column shape with a diameter of 24 mm and a length of 67 mm (a volume of 0.0303 L), was dipped in this slurry, wash coated and dried at 150° C. for 5 minutes, then air calcined at 500° C. for 1 hour, and further treated at 500° C. for 3 hours under a stream with 5% by volume hydrogen and 95% by volume nitrogen to thus obtain a catalyst 1 coated with components of 1.33 g of platinum, 0.667 g of palladium, 1.87 g of barium, 100 g of silica-alumina and 20 g of β-zeolite per 1 L-volume of the substrate.

Catalysts m, n and o having different adding amounts of barium were produced in the same manner. Note that compositions of the catalysts m, n and o were the same as the catalyst 1 except for an amount of barium and the barium amounts were described in Table 4.

Example 5

100.0 g of silica-alumina (BET specific surface area of 150 m$^2$/g, pore volume of 0.8 mL/g, silica content of 5% by mass, average particle diameter of 6 μm) was impregnated with a mixed solution of 11.80 g of an aqueous dinitrodiammine platinum solution containing platinum in an amount that corresponds to 1.333 g, 4.70 g of a palladium nitrate solution containing palladium in an amount that corresponds to 0.667 g, and 7.12 g of barium nitrate. Then, the silica-alumina powder impregnated with the platinum, palladium and barium solution was dried at 120° C. for 8 hour, and the obtained powder was further calcined at 500° C. for 1 hour to thus obtain Pt/Pd/Ba-supported silica-alumina powder. In this step, barium is present in a form of barium carbonate or barium oxide. The obtained Pt/Pd/Ba-supported silica-alumina powder and 20 g of β-zeolite (silica/alumina molar ratio=35, surface area of 543 m$^2$/g, average particle diameter of 0.6 μm) were mixed in 183 g of water and wet milled to obtain an aqueous slurry. A cordierite substrate (trade name "Celcor" manufactured by Corning Incorporated, the number of cells: 400 cells per 1 in$^2$ of cross-sectional area), which was cut out into a column shape with a diameter of 24 mm and a length of 67 mm (a volume of 0.0303 L), was dipped in this slurry, wash coated and dried at 150° C. for 5 minutes, then air calcined at 500° C. for 1 hour, and further treated at 500° C. for 3 hours under a stream with 5% by volume hydrogen and 95% by volume nitrogen to thus obtain a catalyst p coated with components of 1.33 g of platinum, 0.667 g of palladium, 3.74 g of barium, 100 g of silica-alumina and 20 g of β-zeolite per 1 L-volume of the substrate.

A catalyst q having a different adding amount of barium was produced in the same manner. Note that the composition of the catalyst q was the same as the catalyst p except for an amount of barium and the barium amount was described in Table 4.

Example 6

100.0 g of silica-alumina (BET specific surface area of 150 m$^2$/g, pore volume of 0.8 mL/g, silica content of 5% by mass, average particle diameter of 6 μm) was impregnated with 4.00 g of a tetraammine palladium acetate solution containing palladium in an amount that corresponds to 0.667 g. Then, the silica-alumina powder impregnated with the palladium solution was dried at 120° C. for 8 hour, and the obtained powder was further calcined at 500° C. for 1 hour to thus obtain Pd-supported silica-alumina powder. This Pd-supported silica-alumina powder was further impregnated with an aqueous magnesium nitrate solution (5.24 g of magnesium nitrate hexahydrate was dissolved in 95 g of water) and then dried at 120° C. for 8 hours, and the powder was calcined at 500° C. for 1 hour to obtain (Pd) Mg-supported silica-alumina powder. In this step, magnesium is present in a form of magnesium oxide. The obtained (Pd) Mg-supported silica-alumina powder, 20 g of β-zeolite (silica/alumina molar ratio=35, surface area of 543 m$^2$/g, average particle diameter of 0.6 μm) and 14.81 g of an aqueous bisethanol amine platinum solution containing platinum in an amount that corresponds to 1.333 g were mixed in 170 g of water and wet milled to obtain an aqueous slurry. A cordierite substrate (trade name "Celcor" manufactured by Corning Incorporated, the number of cells: 400 cells per 1 in$^2$ of cross-sectional area), which was cut out into a column shape with a diameter of 24 mm and a length of 67 mm (a volume of 0.0303 L), was dipped in this slurry, wash coated and dried at 150° C. for 5 minutes, and then air calcined at 500° C. for 1 hour to thus obtain a catalyst r coated with components of 1.333 g of platinum, 0.667 g of palladium, 0.497 g of magnesium, 100 g of silica-alumina and 20 g of β-zeolite per 1 L-volume of the substrate.

Note that the composition of the catalyst r was the same as the catalyst a and the magnesium amount was described in Table 1.

Comparative Example 1

100.0 g of silica-alumina (BET specific surface area of 150 m$^2$/g, pore volume of 0.8 mL/g, silica content of 5% by mass, average particle diameter of 6 μm) was impregnated with a mixed solution of 11.80 g of an aqueous dinitrodiammine platinum solution containing platinum in an amount that corresponds to 1.333 g and 4.70 g of a palladium nitrate solution containing palladium in an amount that corresponds to 0.667 g. Then, the silica-alumina powder impregnated with the platinum and palladium solution was dried at 120° C. for 8 hour, and the obtained powder was further calcined at 500° C. for 1 hour to thus obtain Pt/Pd-supported g silica-alumina powder. 20 g of β-zeolite (silica/alumina molar ratio=35, surface area of 543 m$^2$/g, average particle diameter of 0.6 μm) and 183 g of water were mixed in the obtained (Pt/Pd) supported silica-alumina powder and wet milled to obtain an aqueous slurry. A cordierite substrate (trade name "Celcor" manufactured by Corning Incorporated, the number of cells: 400 cells per 1 in$^2$ of cross-sectional area), which was cut out into a column shape with a diameter of 24 mm and a length of 67 mm (a volume of 0.0303 L), was dipped in this slurry, wash coated and dried at 150° C. for 5 minutes, then air calcined at 500° C. for 1 hour, and further treated at 500° C. for 3 hours under an air flow with 5% by volume hydrogen and 95% by volume nitrogen to thus obtain a catalyst s coated with components of 1.33 g of platinum, 0.667 g of palladium, 100 g of silica-alumina, and 20 g of β-zeolite per 1 L-volume of the substrate.

<Aging Treatment>

Aging treatments were carried out on respective catalysts a to r obtained in Examples and the catalyst s obtained in Comparative Example, by thermally treating the catalysts at 700° C. for 50 hours in an electric furnace in the atmosphere. This is an aging test as assumed that the catalysts are used in diesel engines.

<Evaluation of Performance of Catalysts for Exhaust Gas Purification>

Figure 2:
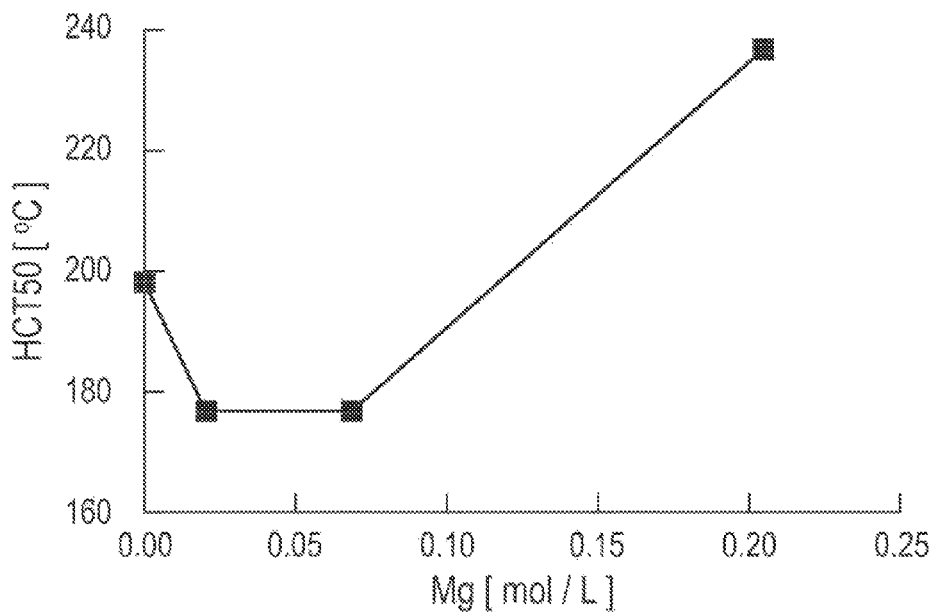
FIG. 2 is a graph showing Mg contents and 50% HC conversion in catalysts (three-dimensional structures) obtained in examples.
Figure 3:
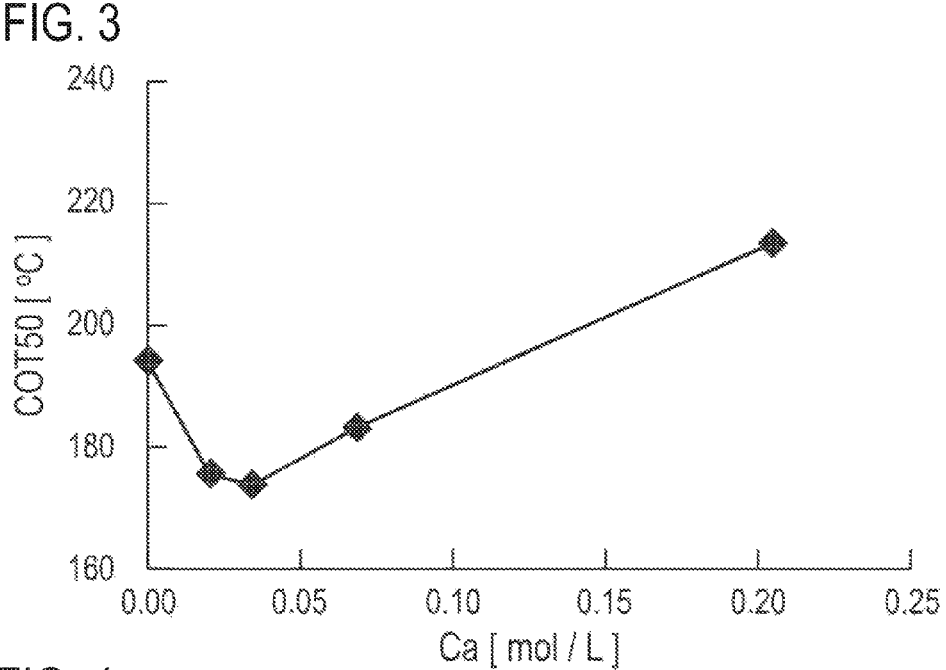
FIG. 3 is a graph showing Ca contents and 50% CO conversion in catalysts (three-dimensional structures) obtained in examples.
Figure 4:
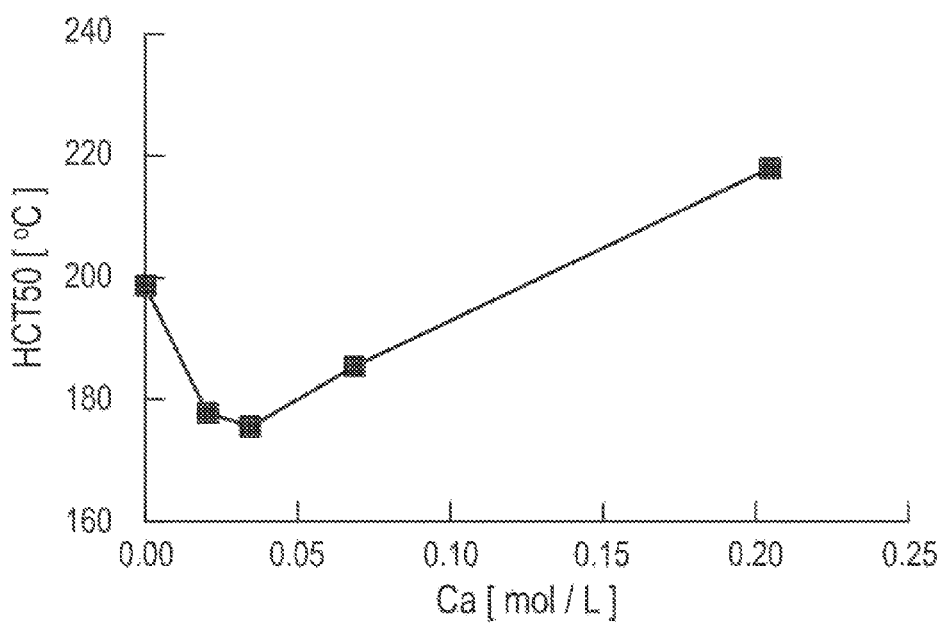
FIG. 4 is a graph showing Ca contents and 50% HC conversion in catalysts (three-dimensional structures) obtained in examples.
Figure 5:
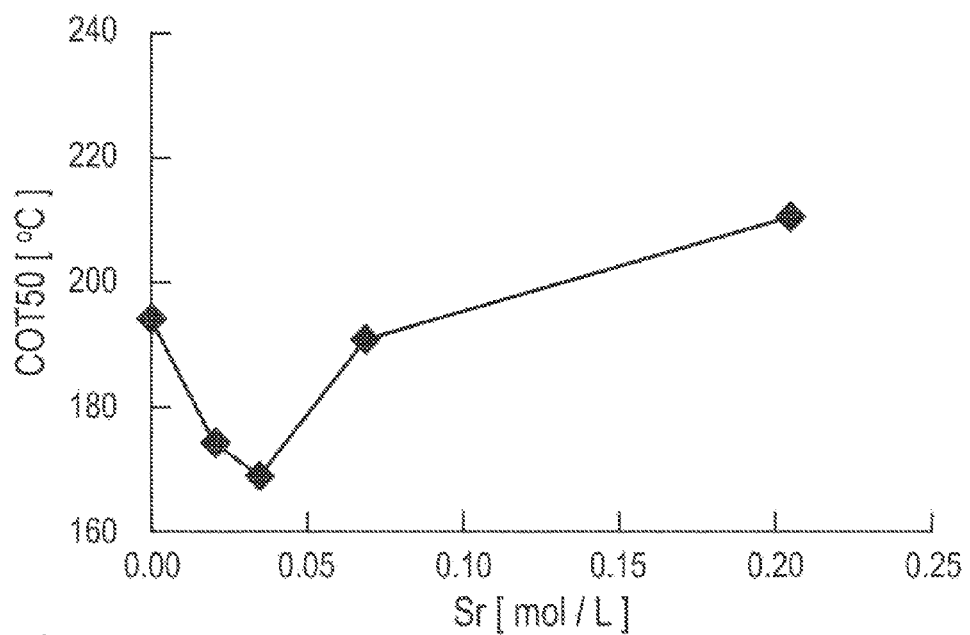
FIG. 5 is a graph showing Sr contents and 50% CO conversion in catalysts (three-dimensional structures) obtained in examples.
Figure 6:
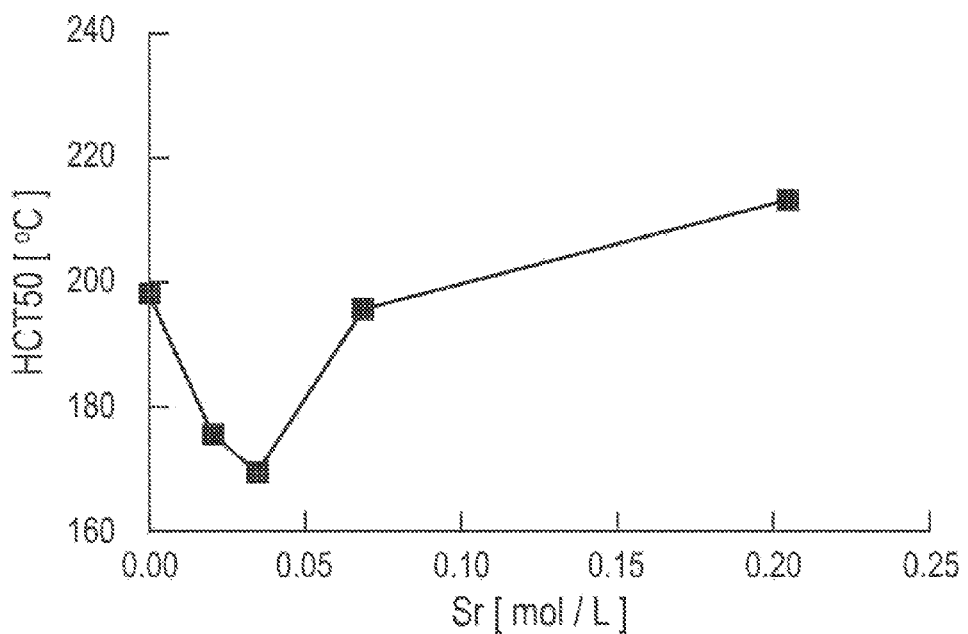
FIG. 6 is a graph showing Sr contents and 50% HC conversion in catalysts (three-dimensional structures) obtained in examples.
Figure 7:
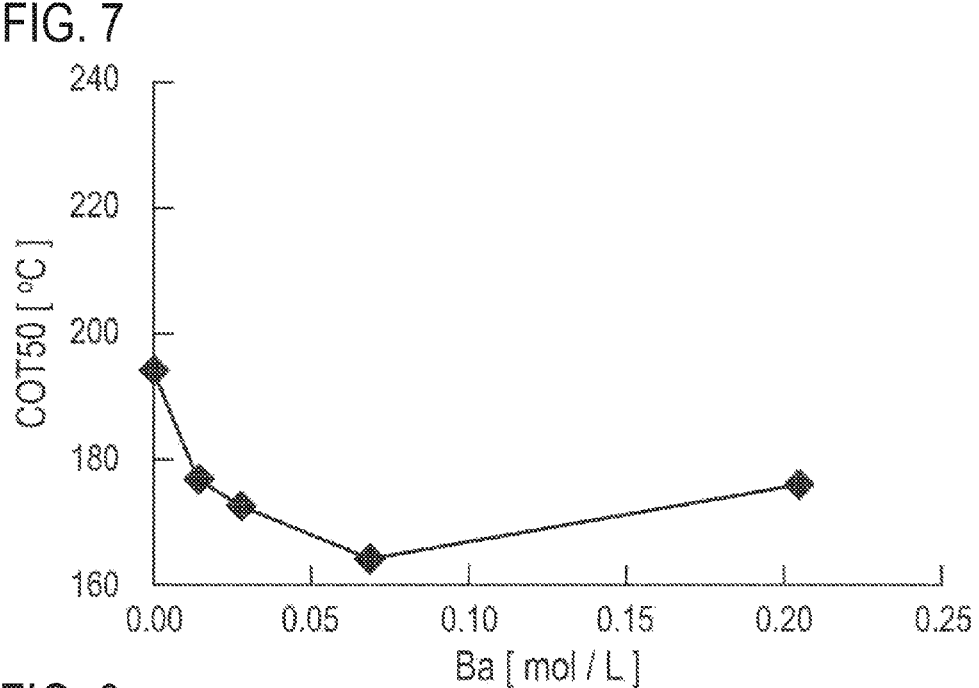
FIG. 7 is a graph showing Ba contents and 50% CO conversion in catalysts (three-dimensional structures) obtained in examples.
Figure 8:
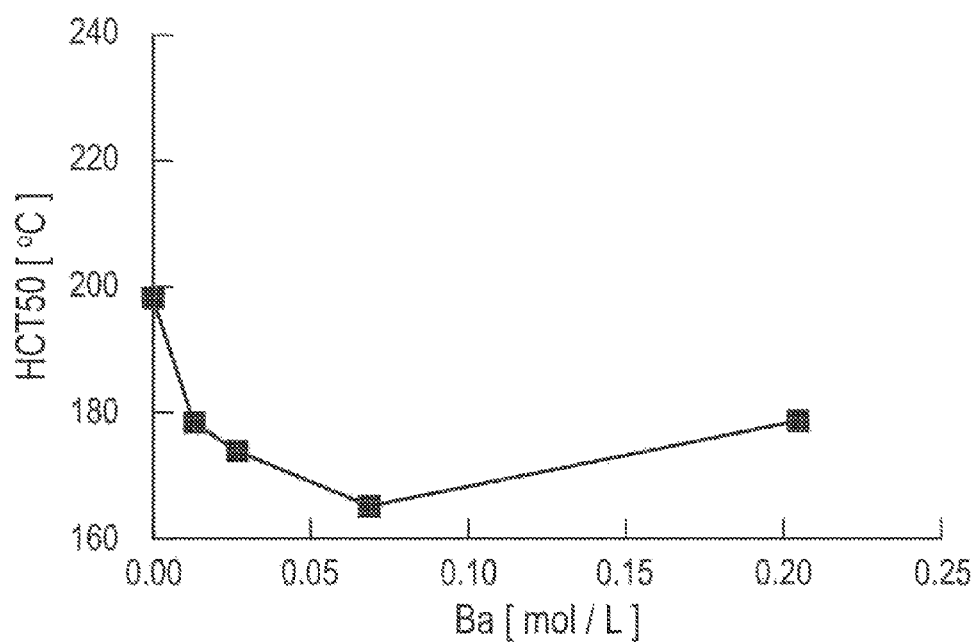
FIG. 8 is a graph showing Ba contents and 50% HC conversion in catalysts (three-dimensional structures) obtained in examples.
Figure 9:
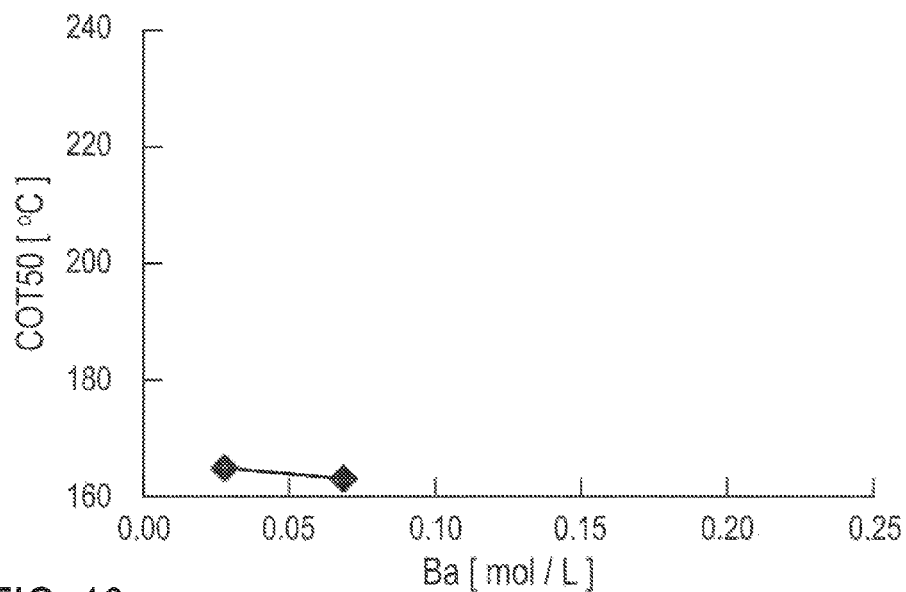
FIG. 9 is a graph showing Ba contents and 50% CO conversion in catalysts (three-dimensional structures) obtained in examples.
Figure 10:
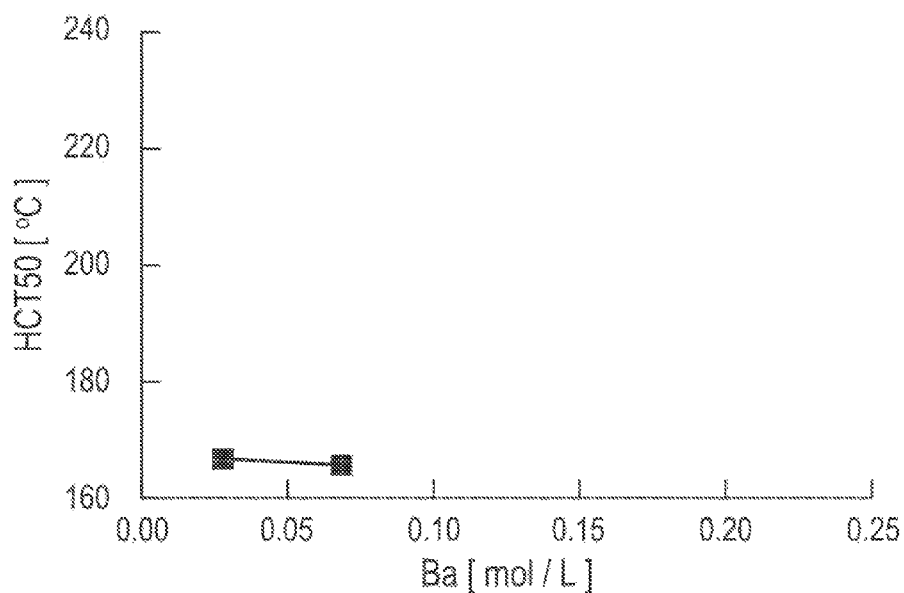
FIG. 10 is a graph showing Ba contents and 50% HC conversion in catalysts (three-dimensional structures) obtained in examples.

A gas (spatial velocity of 40000 $hr^{-1}$, gas linear velocity of 0.75 m/sec) under the condition in Table 5 was flown through each catalyst after the above described aging treatment, and the temperature of the gas was increased at a temperature increasing rate of 20° C./min. FIGS. 1 to 10 showed graphs of plotting an adding amount (mol/L) of magnesium, calcium, strontium or barium in respective catalysts, assuming that an inlet temperature of a catalyst at the time when 50% of carbon monoxide is purified in a catalyst outlet is COT50, and in the same manner, an inlet temperature of a catalyst at the time when 50% of propylene is purified in a catalyst outlet is HCT50. Note that a plot of 0 (mol/L) showing adding amounts of metal components in FIGS. 1 to 8 expresses performance of the catalyst s of Comparative Example 1. FIG. 1 and FIG. 2 respectively express COT50 and HCT50 of the catalysts a to c in Example 1. FIG. 3 and FIG. 4 respectively express COT50 and HCT50 of the catalysts d to g in Example 2. FIG. 5 and FIG. 6 respectively express COT50 and HCT50 of the catalysts h to k in Example 3. FIG. 7 and FIG. 8 respectively express COT50 and HCT50 of the catalysts l to o in Example 4. FIG. 9 and FIG. 10 respectively express COT50 and HCT50 of the catalysts p and q in Example 5.

TABLE 1

Adding amount of magnesium

| | Catalyst names | Magnesium contents in three-dimensional structures [g/L] | Magnesium contents in three-dimensional structures [mol/L] |
|---|---|---|---|
| Example 1 | a | 0.497 | 0.020 |
| | b | 1.657 | 0.068 |
| | c | 4.971 | 0.205 |
| Example 6 | r | 0.497 | 0.020 |

TABLE 2

Adding amount of calcium

| | Catalyst names | Calcium contents in three-dimensional structures [g/L] | Calcium contents in three-dimensional structures [mol/L] |
|---|---|---|---|
| Example 2 | d | 0.820 | 0.020 |
| | e | 1.366 | 0.034 |
| | f | 2.732 | 0.068 |
| | g | 8.197 | 0.205 |

TABLE 3

Adding amount of strontium

| | Catalyst names | Strontium contents in three-dimensional structures [g/L] | Strontium contents in three-dimensional structures [mol/L] |
|---|---|---|---|
| Example 3 | h | 1.792 | 0.020 |
| | i | 2.987 | 0.034 |
| | j | 5.974 | 0.068 |
| | k | 17.921 | 0.205 |

TABLE 4

Adding amount of barium

| | Catalyst names | Barium contents in three-dimensional structures [g/L] | Barium contents in three-dimensional structures [mol/L] |
|---|---|---|---|
| Example 4 | l | 1.873 | 0.014 |
| | m | 3.745 | 0.027 |
| | n | 9.363 | 0.068 |
| | o | 28.088 | 0.205 |
| Example 5 | p | 3.745 | 0.027 |
| | q | 9.363 | 0.068 |

TABLE 5

Conditions of reaction gas

| Components | Concentrations |
|---|---|
| $C_3H_6$ | 280 ppmCl |
| CO | 1000 ppm |
| NO | 80 ppm |
| $O_2$ | 12% |
| $CO_2$ | 6% |
| $H_2O$ | 7% |
| $N_2$ | BALANCE |

TABLE 6

Evaluation results

| | Catalyst names | CO T50 [° C.] | HC T50 [° C.] |
|---|---|---|---|
| Example 1 | a | 174 | 177 |
| | b | 175 | 177 |
| | c | 233 | 237 |
| Example 2 | d | 175.5 | 177.5 |
| | e | 174 | 175.5 |
| | f | 183 | 185 |
| | g | 213.5 | 218 |
| Example 3 | h | 174 | 176 |
| | i | 169 | 170 |
| | j | 191 | 196 |
| | k | 210 | 213.5 |
| Example 4 | l | 176.5 | 178.5 |
| | m | 164 | 167 |
| | n | 162 | 166 |
| | o | 175.5 | 179 |
| Example 5 | p | 165 | 167 |
| | q | 163 | 166 |
| Example 6 | r | 178 | 181 |
| Comparative Example 1 | s | 194 | 198.5 |

As shown in FIGS. 1 to 10, it was confirmed that the catalysts a to r of examples to which magnesium, calcium, strontium or barium was added can oxidize CO and propylene from a lower temperature as compared to the catalyst s of comparative example. When magnesium, calcium and strontium were added up to 0.205 mol/L per 1 L-volume of a substrate, performance was adversely deteriorated as compared to the catalyst s of comparative example, and barium was added in an amount of 0.205 mol/L per 1 L-volume of a substrate, the catalysts was able to oxidize CO and propylene from a lower temperature as compared to the catalyst s of comparative example.

In addition, the present application is based on Japanese Patent Application No. 2011-066583 filed on Mar. 24, 2011, and the disclosure of which is incorporated herein by reference.

The invention claimed is:

1. An oxidation catalyst for exhaust gas purification comprising:
   a refractory inorganic oxide (A),
   β-zeolite (B), and
   a catalyst component (C-a) and a metal component (C-b), which are supported on the refractory inorganic oxide (A), said components (A), (B), (C-a) and (C-b) being supported on a three-dimensional structure (D),
   wherein the catalyst component (C-a) is (i) platinum, or (ii) platinum and palladium,
   wherein the metal component (C-b) is magnesium in an amount of 0.001 to 0.12 mol per 1 L of the catalyst calculated as Mg, and
   wherein a total amount of the refractory inorganic oxide and the β-zeolite is in a range of 1-250 g per 1 L of the catalyst.

2. The oxidation catalyst for exhaust gas purification according to claim 1, wherein when the catalyst component is platinum and palladium, platinum/palladium (metal mass ratio) is 40/1 to 1/1.

3. The oxidation catalyst for exhaust gas purification according to claim 1, wherein the catalyst component and the metal component are supported on the refractory inorganic oxide simultaneously or one by one in turn.

4. A method for producing an oxidation catalyst for exhaust gas, comprising:
   (i-1) adding a water-soluble precious metal salt of (a) platinum or (b) platinum and palladium being a material of a catalyst component (C-a) and a water-soluble metal salt (C-b) being magnesium to a refractory inorganic oxide (A) to be mixed, or
   (i-2) a water-soluble precious metal salt being a material of the catalyst component (C-a) to the refractory inorganic oxide to obtain a catalyst component-supported refractory inorganic oxide (A), and then adding a solution that contains a water-soluble metal salt and mixing each other to obtain the catalyst component, dried and/or calcined, and the metal component-supported-refractory inorganic oxide (A),
   (ii) mixing β-zeolite (B) with the catalyst component (C-a) and the metal component (C-b) supported refractory inorganic oxide (A) obtained in either (i-1) or (i-2) to obtain a mixture of the catalyst component and the metal component-supported refractory inorganic oxide (A), and
   (iii) preparing a slurry which contains the catalyst component (C-a), metal component (C-b) supported refractory inorganic oxide (A) and β-zeolite (B) obtained in (ii), and the slurry is coated on a three-dimensional structure (D), wherein a supported amount of magnesium is 0.001 to 0.12 mol per 1 L of the catalyst calculated as Mg, and wherein a total amount of refractory inorganic oxide and the β-zeolite is in a range of 1-250 g per 1 L of the catalyst.

5. A method for purifying an exhaust gas, wherein an exhaust gas is processed using the catalyst set forth in claim 1.

6. A method for purifying an exhaust gas, wherein an exhaust gas is processed using a catalyst obtained by the production method set forth in claim 4.

7. The oxidation catalyst for exhaust gas purification according to claim 1, wherein a silica/alumina molar ratio in the β-zeolite is 15-500.

8. The oxidation catalyst for exhaust gas purification according to claim 1, wherein the amount of magnesium is 0.005 to 0.1 mol per 1 L of the catalyst calculated as Mg.

9. The oxidation catalyst for exhaust gas purification according to claim 1, wherein the amount of magnesium is 0.01 to 0.09 mol per 1 L of the catalyst calculated as Mg.

10. The oxidation catalyst for exhaust gas purification according to claim 1, wherein the amount of magnesium is 0.015 to 0.08 mol per 1 L of the catalyst calculated as Mg.

11. The oxidation catalyst for exhaust gas purification according to claim 1, wherein the amount of magnesium is 0.02 to 0.075 mol per 1 L of the catalyst calculated as Mg.

12. The oxidation catalyst for exhaust gas purification according to claim 1, wherein a supported amount of the catalyst component is 0.1-10% by mass to the refractory inorganic oxide calculated as the metal.

13. The oxidation catalyst for exhaust gas purification according to claim 2, wherein the catalyst component is an alloy of platinum and palladium, when platinum and palladium are used.

14. The method for producing the oxidation catalyst for exhaust gas purification according to claim 6, wherein a supported amount of magnesium is 0.005 to 0.1 mol per 1 L of the catalyst calculated as Mg.

15. The method for producing the oxidation catalyst for exhaust gas according to claim 7, wherein the β-zeolite is mixed at (i-2).

16. The method for producing the oxidation catalyst for exhaust gas according to claim 4, wherein the amount of magnesium is 0.01 to 0.09 mol per 1 L of the catalyst calculated as Mg.

17. The method for producing the oxidation catalyst for exhaust gas according to claim 4, wherein the amount of magnesium is 0.015 to 0.08 mol per 1 L of the catalyst calculated as Mg.

18. The method for producing the oxidation catalyst for exhaust gas according to claim 4, wherein the amount of magnesium is 0.02 to 0.075 mol per 1 L of the catalyst calculated as Mg.

19. The method for producing the oxidation catalyst for exhaust gas purification according to claim 4, wherein a supported amount of the catalyst component is 0.1-10% by mass to the refractory inorganic oxide calculated as the metal.

20. The oxidation catalyst for exhaust gas according to claim 1, wherein a total amount of the refractory inorganic oxide and β-zeolite is in the range of 10-150 g per 1 L of the catalyst.

21. The oxidation catalyst for exhaust gas according to claim 1, wherein a total amount of the refractory inorganic oxide and β-zeolite is in the range of 15-100 g per 1 L of the catalyst.

* * * * *